(12) United States Patent
Lecrivain

(10) Patent No.: US 6,640,963 B2
(45) Date of Patent: Nov. 4, 2003

(54) DEVICE FOR CONVEYING MASSIVE OBJECTS, IN PARTICULAR METAL REELS

(75) Inventor: Alain Lecrivain, Combs la Ville (FR)

(73) Assignee: Via Clecim, Nanterre Cedex (FR)

( * ) Notice: Subject to any disclaimer, the term of this patent is extended or adjusted under 35 U.S.C. 154(b) by 0 days.

(21) Appl. No.: 09/864,271

(22) Filed: May 25, 2001

(65) Prior Publication Data

US 2002/0056608 A1 May 16, 2002

(30) Foreign Application Priority Data

May 25, 2000 (FR) .............................. 00 06712

(51) Int. Cl.[7] ...................... B65G 25/04; B65G 37/00; B65G 47/34; B65G 47/84; B65G 15/58
(52) U.S. Cl. ................... 198/750.2; 198/463.3; 198/468.6
(58) Field of Search .................... 198/459.1, 463.3, 198/468.6, 750.2, 751, 774.1, 775; 104/162, 165, 169; 414/749.1

(56) References Cited

U.S. PATENT DOCUMENTS

| 3,664,518 A | | 5/1972 | Petros et al. | |
|---|---|---|---|---|
| 4,236,626 A | * | 12/1980 | Noe | 198/468.6 |
| 4,387,800 A | * | 6/1983 | Noe | 198/750.8 |
| 4,971,508 A | * | 11/1990 | JPX et al. | 104/137 |
| 5,025,912 A | | 6/1991 | Hashizume et al. | |
| 6,223,885 B1 | * | 5/2001 | Markiewicz | 198/463.3 |
| 6,364,093 B1 | * | 4/2002 | LaBolt | 198/775 |

FOREIGN PATENT DOCUMENTS

DE      1935021      4/1970

* cited by examiner

Primary Examiner—Gene O. Crawford
(74) Attorney, Agent, or Firm—Arent Fox Kintner Plotkin & Kahn

(57) ABSTRACT

A device for stepwise conveying of massive objects, includes a fixed series of laying stations spaced by a constant pitch and a mobile series of recovery stations spaced by the same pitch and arranged on a supporting beam that is movable vertically and longitudinally. The supporting beam rests on the floor by means of at least two actuators for level adjustment operated in a synchronous fashion and each associated with a device for sliding guiding of the supporting beam thereby enabling longitudinal displacement of the said beam in a forward direction in raised position and in a backward direction in lowered position.

19 Claims, 3 Drawing Sheets

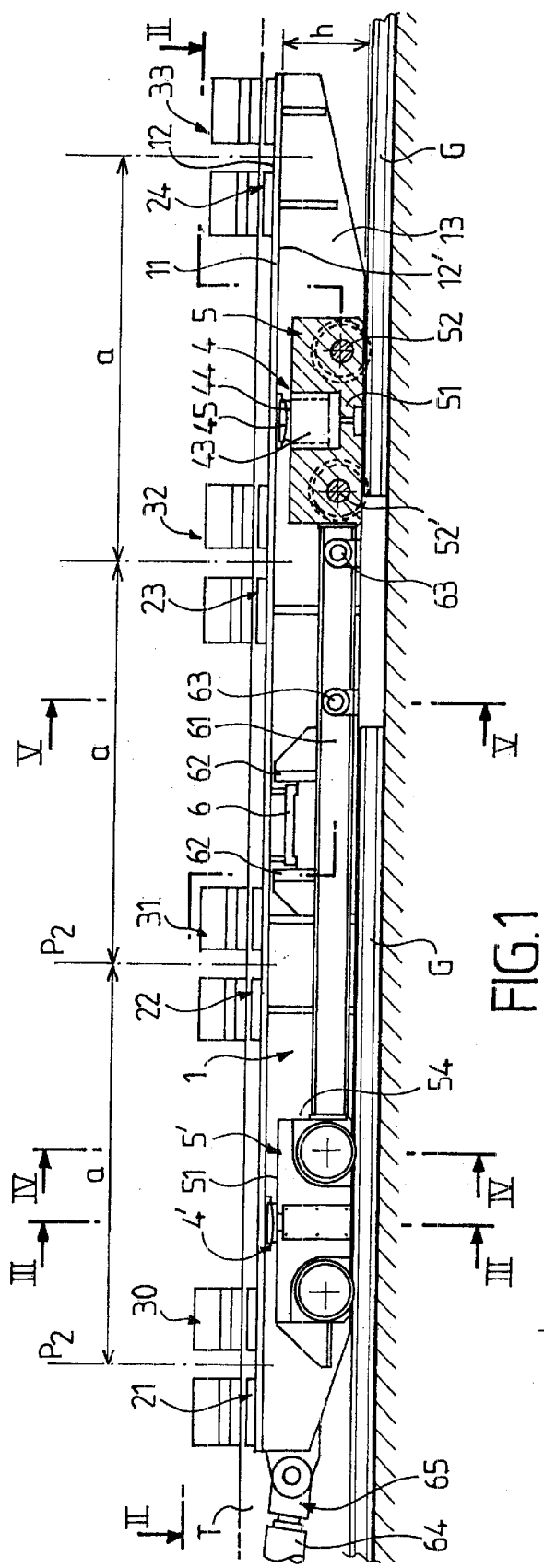
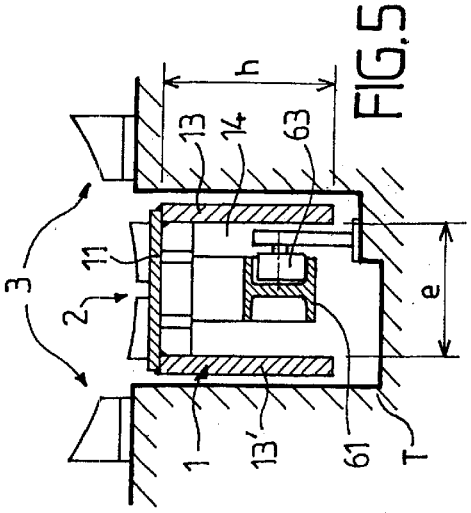
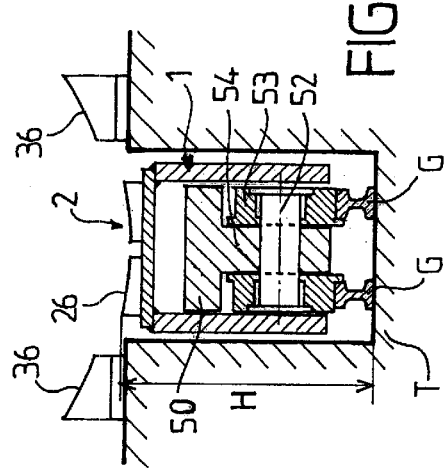
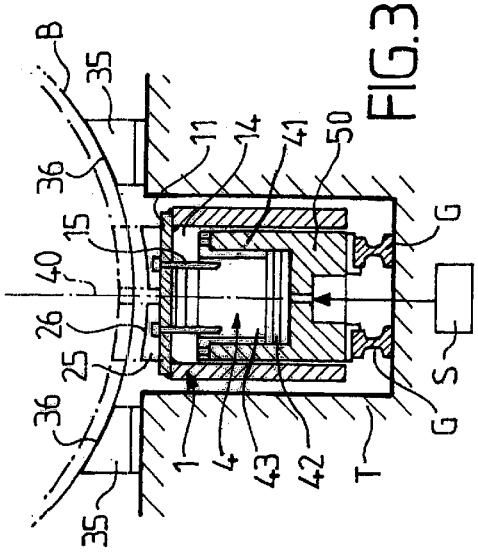

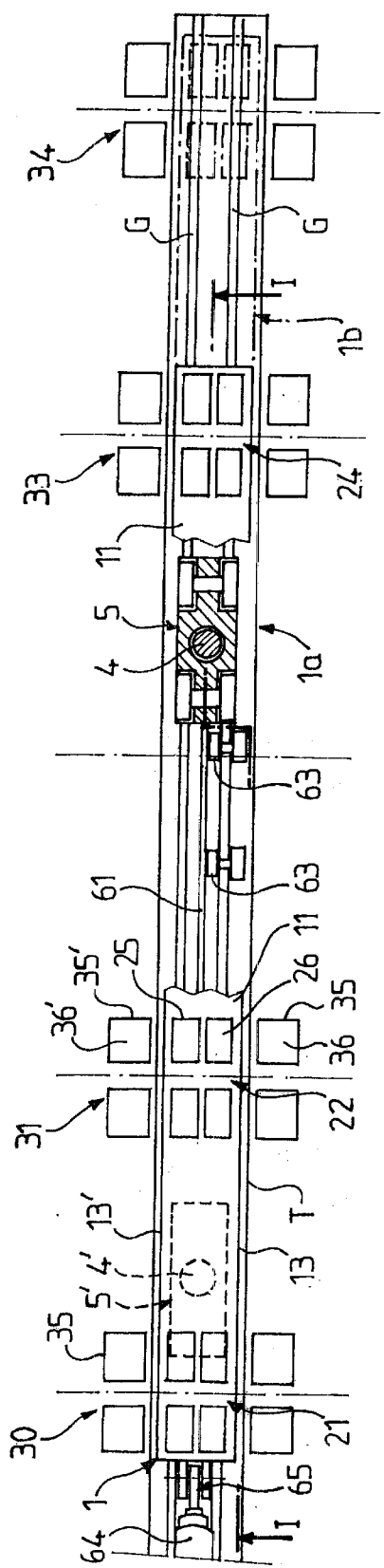

DEVICE FOR CONVEYING MASSIVE OBJECTS, IN PARTICULAR METAL REELS

The invention relates to a stepwise conveying device of large objects and applies more especially to the displacement of reels in installations for the manufacture and treatment of metal bands.

In the metallurgical industry, thin sheets and strips, usually available in the form of band wound into reels, are made out of a raw product such as a slab that must be subject to various hot rolling, then cold rolling operations until the requested thickness is obtained as well as, if necessary, various treatments such as annealing, etching, skin-pass, etc.

Until recently, these operations had been carried out while causing each reel to run successively in separate installations. Each installation is then associated with an unwinder and a winder placed respectively upstream and downstream, in the running direction, whereas each reel is re-wound at the outlet of an installation in order to be transported on an unwinder situated at the inlet of the following installation.

Means for transporting the reels between the diverse treatment installations are therefore required.

On the other hand, the running speeds in the various installations are often different and it is therefore necessary to foresee storing facilities for a number of reels between two successive installations.

The reels can be transported one after the other using a travelling crane or, at floor level, by a conveying device.

Such a device comprises, usually, a series of stations for laying the reels, associated with a means of simultaneous transfer of the reels, from each laying station to the next, whereas each reel moves forward step by step from the outlet of a treatment installation to the inlet of the following installation.

Thus, a number of reels can be stored on the laying stations, between two treatment installations.

Normally, the length of band wound around a reel is several hundred meters and its weight may reach several tens of tons. A conveyor comprises, usually, four or five laying stations, which corresponds to a total load of 100 to 200 tons. If needed, several conveyors are available after one another, in order to increase the storing possibilities and the transport distance.

For several years, it has been endeavoured to realise continuous lines enabling to run the band directly from an installation to the next, but the possibilities are limited and there are still separate installations that call for a transport of the reels over a certain distance.

Generally, a stepwise conveyor comprises a fixed series of laying stations distributed along a longitudinal displacement direction and centred on transversal planes spaced apart by a constant pitch and a mobile series of recovery stations spaced by the same pitch and arranged on a longitudinal supporting beam, mobile on the one hand vertically, between a lowered position and a raised position for which the recovery stations are placed, respectively, below and above laying stations and, on the other hand, longitudinally, between a retracted position and a forward position for which each recovery station is centred, alternately, on the transversal planes of two successive laying stations.

Thus, in the retracted position of the beam, the recovery stations are placed below the laying stations and centred on the same transversal planes as the laying stations. Lifting the beam assembly up to its raised position therefore enables each recovery station to take charge of the reel placed on the corresponding laying station.

The supporting beam is then brought forward by a single step while moving the set of reels above the ground, whereas each recovery station is placed above the following laying station. Lowering the beam enables to lay the reels on the corresponding laying stations. The beam thus unloaded may then return to its initial retracted position, whereas the recovery stations run below reels placed on the fixed laying stations.

Usually, the laying stations are each composed of two bearing sections arranged on the floor, provided on either side of a trench in which the longitudinal supporting beam is placed, whereas each recovery station is thus located between both bearing sections of the corresponding laying station.

These recovery stations are necessarily rather narrow and the vertical and horizontal displacements should be performed without any jerks to avoid any risks of a reel, whose weight may exceed 20 tons, losing its balance and falling down.

Since the conveying device must be able to store several reels, the total load supported by the beam may be in the order of 100 to 200 tons. A beam capable of supporting such a load must obviously be sufficiently rigid and have, in particular, quite a significant height to sustain deflection.

On the other hand, the supporting stations are relatively narrow and the beam should move parallel to itself, while remaining perfectly horizontal, to preserve the balance of the reels. To this end, deformable parallelepiped systems are used normally, comprising at least two sets of rods whose rotation is controlled by actuators to determine the lifting and the lowering of the beam. The rods should not be arranged in a straight position, but slightly tilted at the onset, in the lowered position of the beam. Such systems are therefore rather cumbersome and increase the total height of the device.

The purpose of the invention is to remedy these shortcomings and solve all the problems that have just been exposed thanks to a new conveying device, particularly simple and cheap that enables, quite safely, stepwise displacement of massive and very heavy objects such as metal reels.

According to the invention, the supporting beam of the recovery stations rests on the floor by means of at least two sliding bearing members, of adjustable height, extending vertically over at least a portion of the height of the beam and comprising, respectively, at least two actuators to adjust the level of the synchronism operated beam and associated, respectively, with at least two sliding guiding means of the supporting beam enabling longitudinal reciprocating displacement of the said beam, respectively in a forward direction in raised position and in a retraction direction in lowered position, whereas each actuator comprises two elements, respectively fixed and mobile, bearing in opposed directions, respectively on the beam and on the floor.

In a particularly advantageous fashion, the level adjustment actuators of the beam are hydraulic jacks associated with a feeding system at constant flowrate, identical for all jacks, in order to keep the beam horizontal during its displacements, regardless of the distribution of the load.

As stated above, indeed, the supporting beam must sustain the load of several reels and comprises, to this end, a horizontal sole on which are mounted the recovery stations and at least one vertical stiffening girder with sufficient height for the beam to remain rigid under the load of the transported objects. In a particularly advantageous fashion, the adjustment actuators extend over at least a portion of the height of the girder, in the lowered position of the beam so that the total height of the device is of the same order of that of the beam.

In a preferred embodiment, the longitudinal beam exhibits, as a transversal cross-section, a reverted U shape comprising a substantially horizontal upper portion, forming a sole for the recovery stations and two substantially vertical wings, forming stiffening girders of the beam and, in the lowered position of the said beam, at least the level adjustment actuators are accommodated inside the beam, between both wings.

In a particularly advantageous embodiment, each sliding bearing member comprises a supporting carriage composed of a chassis resting on at least one longitudinal guiding rail by means of two running gears spaced longitudinally and on which is mounted at least one hydraulic actuator for level adjustment of the supporting beam.

In particular, the carriage can be supported by two axles spaced longitudinally, on either side of a central section of the chassis forming a bearing platform of a hydraulic adjustment actuator having one element fixed on the platform and one mobile element resting on the beam.

According to another particularly advantageous feature, the beam is connected, in vertical displacement, with the mobile elements of the actuators and the supporting carriages of the actuators are maintained against the guiding path by an anti-rise means opposing the lifting motion of either of the supporting carriages with respect to the guiding path. To this end, the supporting carriages can be connected advantageously, in the longitudinal direction, by at least one linking bar composed of a structural bar having at least one sole passing below at least two anti-rise rollers, spaced longitudinally.

In a first embodiment of the invention, the assembly composed of each supporting carriage with its running gears and the adjustment actuator, is not as wide as the space between both wings of the beam in order to rest at least partially in the said space, in lowered position of the beam.

In a second embodiment, each supporting carriage comprises a chassis placed between both wings of the U-shaped beam and resting on both guiding rails by means of two running gears spaced longitudinally and each containing a pair of wheels placed outside the beam and mounted at two extremities of an axle running through a bore into the chassis and traversing both wings of the beam while running through oblong holes provided in the said wings and each of sufficient height to enable vertical displacements of the beam between the lowered position and the raised position.

Advantageously, the width of each oblong hole through which runs the extremity of an axle, is substantially equal to the diameter of the said axle in order to form a connection means, in the longitudinal direction, of the beam with the corresponding supporting carriage.

The alternating longitudinal displacement means of the beam can be composed of at least one hydraulic actuator with a first element resting on a fixer section and a second element resting on a section integral with the beam, in longitudinal displacement.

However, since the level adjustment actuators determine perfectly vertical displacement of the beam, there is practically no horizontal reaction to be compensated for. Consequently, the longitudinal displacement means of the beam can be composed of a cable running over two intermediate means placed at two extremities of the guiding path and having two belts fixed respectively at both extremities of the supporting beam, whereas the said cable is driven into two opposite directions to control, respectively, the forward motion and the retraction of the beam.

Other advantageous features are subject to sub-claims. But the invention will be understood better by the following description of certain particular embodiments, given for exemplification purposes and represented on the appended drawings.

FIG. 1 shows the conveying device assembly, as a longitudinal cross section along I, I of FIG. 2.

FIG. 2 is a bottom view, as a partial cross section along II, II of FIG. 1.

FIGS. 3, 4 and 5 are transversal cross sections, respectively along III—III, IV—IV, V—V of FIG. 1.

FIG. 6 is a transversal cross section of an embodiment variation.

FIGS. 7 and 8 show, respectively as a lateral view and a transversal cross section, another embodiment variation.

Figure 9:
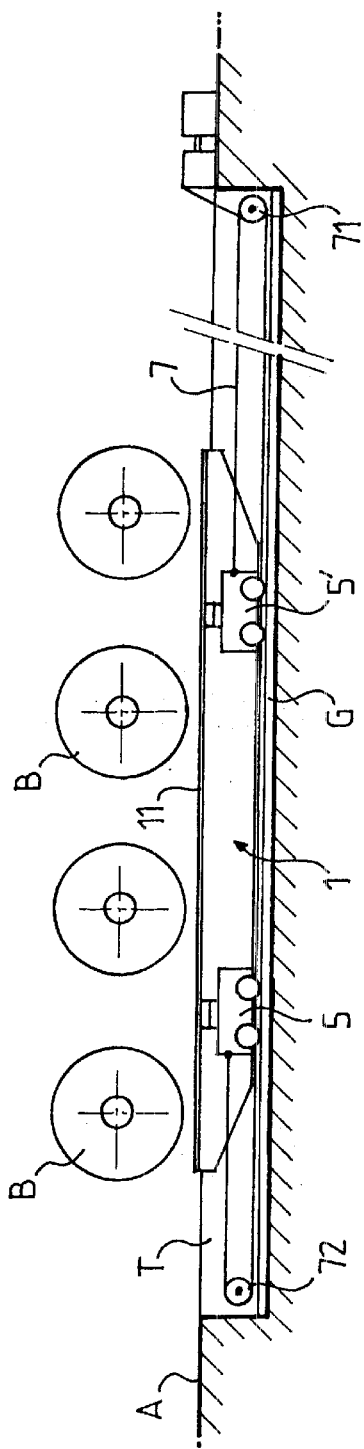
FIG. 9 shows diagrammatically another embodiment of the longitudinal displacement device.
Figure 10:
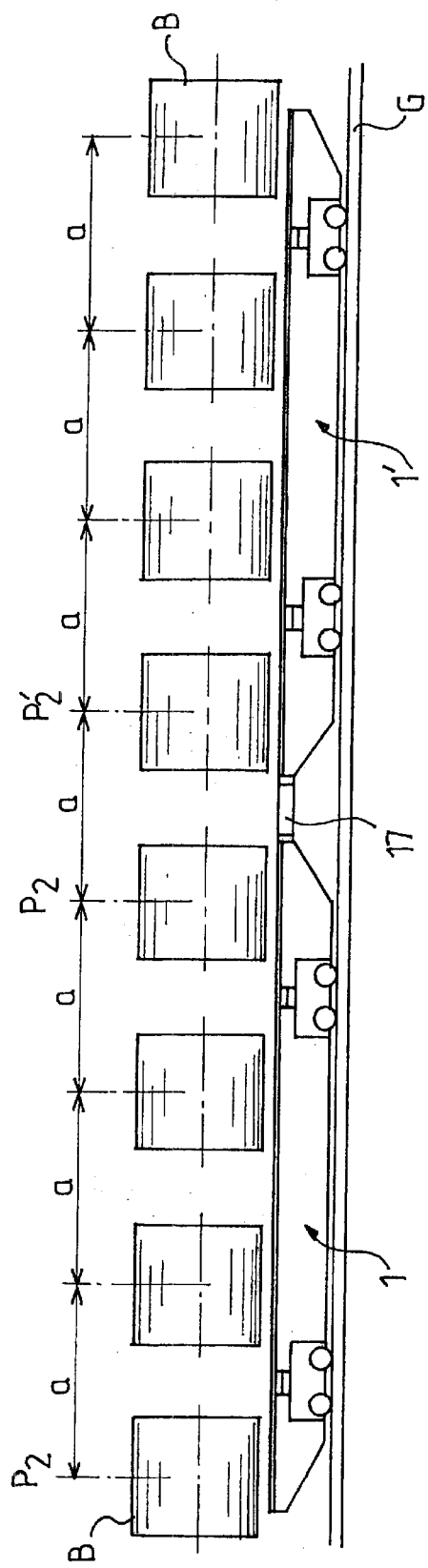
FIG. 10 shows, as a top view, a conveying device with two coupled beams.

FIGS. 1, 2 and 3 represent, respectively, a top view, a bottom view and a transversal cross section, of the conveying device assembly according to the invention that comprises a series of recovery stations 3 centred on a longitudinal vertical plane P1 and a supporting beam 1 centred on the same longitudinal plane P1 and on which are arranged a series of recovery stations 2. The recovery stations 3 are centred, respectively, on a plurality of transversal planes P2 perpendicular to the longitudinal median plane P1 and spaced by a constant pitch (a). Each recovery station 3 is composed advantageously of four pads 35 with upper faces 36 slightly tilted with respect to the horizontal in order to form a wide open obtuse angle, making up a stable rest for a reel B, whereas the said reel has the shape of a cylinder centred on a horizontal axis placed on the median plane P1.

In the example represented, the supporting beam 1 carries four recovery stations 21, 22, 23, 24 whose transversal planes are spaced by the same distance (a).

Each recovery station 2 associated with a recovery station 3 can be made also of four pads 25 arranged on either side, respectively, of the median plane P1 and of a transversal plane P2 and with upper faces 26 tilted with respect to the horizontal. The tilt of the faces of the pads depends on their spacing and is determined so that, in an average vertical position of the beam 1, the faces 36 of the recovery pads 35 and the faces 26 of the recovery pads 25 envelop the external cylindrical face of the reel B.

In the embodiment represented on FIG. 3, the pads 35 making up the recovery stations 3 are placed at the floor level A and the supporting beam 1 is accommodated in a trench T provided in a foundation block so that, in the low position represented on FIG. 1, the recovery stations 2 are located below the level of the laying stations 3.

As usual, such a conveying device determines the stepwise displacement of the reels following a longitudinal direction 10 parallel to the median plane P1 of the beam.

To this end, the beam 1 can move between a backward position 1a and a forward position 1b represented as a mixed line on FIG. 2, whereas the longitudinal displacement is equal to the distance (a) between the transversal planes of the laying and recovery stations.

On the other hand, the beam 1 can move vertically between two positions, respectively raised and lowered, on either side of an average position for which the upper faces 26 of the pads 25 of the recovery stations 2 are placed in the extension of the upper faces 36 of the pads 35 of the laying stations 3.

Thus, in the lowered position of the beam represented as a full line on FIG. 3, the reel B rests, at floor level, on the pads 35 of the laying station 3. Conversely, in the raised position represented as mixed line, each reel B is raised above the floor by the pads 25 of the corresponding recovery station 2.

The beam 1 is then brought forward to the position 1b represented as a mixed line on FIG. 1, for which the reels supported by the recovery stations 21, 22, 23, 24 are centred on the transversal planes of the laying stations, respectively 31, 32, 33, 34.

Lowering the beam 1 therefore enables to place the reels on the laying stations 31, 32, 33, 34, whereas each reel has also moved forward by one step (a). In the meantime, a new reel has been placed on the rearmost laying station 30.

The beam 1 thus released from the load of the reels is then brought backward by the distance (a) to return to its backward position 1, whereas each recovery station 21, 22, 23, 24 is placed on the transversal plane of the rear recovery station, respectively 30, 31, 32, 33.

The raising of the beam 1 is then operated and the recovery stations 21, 22, 23, 24 take control of the reels placed respectively on the laying stations 30, 31, 32, 33.

In the meantime, the reel placed on the last foremost laying station 34 has been removed, for example using a travelling crane if the conveying device emerges into the inlet of a treatment installation.

As indicated above, such a stepwise displacement system was already known, but the invention differs from the previous provisions by the use of more stable and less cumbersome means for the control of longitudinal and vertical displacements of the supporting beam.

Indeed, as shown on FIGS. 1, 2 and 3, the beam 1 rests, simply, on two sliding bearing members each comprising a jack 4, 4' for adjusting the height of the beam 1 associated with a means 5, 5' enabling the beam 1 to slide longitudinally, parallel to itself.

In order to support the very significant load of the reels transported, the beam 1 is realised in a particularly rigid fashion by a mechanically welded construction and comprises a sole 11 with an upper face 12 on which are fixed the recovery stations 21, 22, 23, 24 and at least one stiffening rib 13 with sufficient height (h) to confer to the beam the necessary deflection strength.

In a particularly advantageous fashion, as shown on FIGS. 3, 4, 5, the beam 1 exhibits the shape of a caisson, with a reverted U section, comprising an upper sole 11 and two vertical wings 13, 13' spaced from one another by a distance (e) in order to provide an internal space 14 in which is accommodated at least the level adjustment actuator 4, in its backward position corresponding to the low level of the beam.

In the preferred embodiment represented on the figures, the adjustment actuators (4) are hydraulic jacks each comprising a fixed body 41 delineating a jack chamber centred on a vertical pin 40 placed on the median longitudinal plane P1 of the beam and in which is mounted a sliding piston 42 extended upward by a jack stem 43. This stem is fitted, at its upper section, with a plate 44 on which rests a rounded bearing section 45 fixed to the lower face 12' of the sole 11 and centred on the pin 40 of the jack.

On the other hand, the body 41 of the jack is mounted in a running bearing member composed of a chassis 50 resting on two spaced axles 52, 52'.

Preferably, the sole 11 is connected to the stem 43 of the jack 4 by pivot shafts 15 ensuring rotary fastening of the sole 11 on the stem 43 of the jack. The beam 1 is then connected rigidly, in vertical displacement, with the bearing members 4, 5, 4', 5', when the jacks 4, 4' are blocked.

On the other hand, each running gear of the carriage 5 comprises an axle 52 carrying a pair of wheels 53 such as railway wheels with guiding flanges.

In the example represented on FIGS. 1 and 2, the chassis 50 comprises a massive central portion 51 extended forward and backward, by two median ribs 54 each fitted with a passage bore for the axle 52, whereas a bearing is interposed, but not represented here. This central portion 51 is fitted with a bore in which is mounted the sliding piston 42 of the jack and makes up therefore the body 41 of the jack 4.

The wheels 53 mounted at both extremities of each axle 52 are placed on either side of the rib 54 and remain inside the width of the carriage 5, without exceeding the width (e) of the space 14 comprised between both wings 13, 13' of the caisson beam 1. Thus, the bearing member assembly comprising the jack 4, the chassis 50 and both its running gears 53, 53' can be accommodated, at least partially, inside the said caisson when the beam 1 is in low position.

It ensues that, in this lowered position of the beam 1, the laying stations 2 are situated at a height (H) above the floor that is simply slightly greater than the height (h) of the beam necessary for the resistance of the latter since the difference in height corresponds solely to the thickness of the sections 25 and to the height of the runway G formed, in the case of FIG. 4, by two rails having a running section resting on a sole.

Besides, to reduce this height still further, the runway G can be arranged in order to penetrate also between both wings 13, 13' of the beam 1, as indicated diagrammatically on FIG. 6.

The arrangement according to the invention enables therefore to reduce the global height of the conveyor, which is slightly greater than the height of the beam and, consequently, to restrict the depth of the trench T that must be provided in the foundation block in order to accommodate the conveyor.

On the other hand, the beam 1 is guided vertically with respect to both carriages 5, 5' and is therefore connected rigidly with the latter in the longitudinal displacement direction.

The conveyor thus realised hence forms a flat assembly behaving like a wagon resting on two bogies running on rails.

On the embodiment represented on FIGS. 1 and 2, both carriages 5, 5' supporting the actuators 4, 4' are connected together by a horizontal bar 61 that ensues connection of both carriages 5, 5' in longitudinal displacement. Moreover, on the lower face 12' of the sole 11, a guiding part 6 can be fixed, sliding between two vertical guiding faces 62 fixed to the bar 61 and perpendicular to the longitudinal running direction 10. Thus, during level adjustments, the beam is held, longitudinally, with respect to both carriages 5, 5'.

The loads applied to the beam by both actuators 4, 4' remain therefore centred on fixed transversal planes and determine rigorously vertical displacement of each bearing point of the beam.

It ensues that each recovery station 2 remains always centred, between the lowered position and the raised position, on the transversal plane P2 of the corresponding laying station 3. The risks of unbalanced reels laid on the recovery stations 21 are hence much smaller than in the arrangements used until now.

In particular, the displacement of the reels is far more stable than in usual arrangements with deformable parallelograms in which the beam rests on the extremities of lever whose length must be relatively significant and describe an arc of a circle.

Obviously, both adjustment actuators 4, 4' must be operated in a synchronous manner and at the same speed so that the beam 1 moves parallel to itself, while remaining perfectly horizontal.

Taking into account the very significant load to be moved, but over a little height, it is particularly interesting to use, for level adjustment of the beam 1, hydraulic actuators connected to an easy-to-design control system S, enabling to feed the actuators, in one direction or the other, at a same constant flowrate.

As the actuators 4, 4' are identical, both bearing points 44, 45 of the beam move at the same speed and over a same height, upwards or downwards.

It should be noted that the beam 1 may not be loaded uniformly, at the beginning and at the end of a displacement of a series of reels. The resulting risk of rocking of the beam 1 may be avoided, in the arrangement according to the invention, by using two anti-rise rollers 63 spaced longitudinally and that engage between two wings of the linking bar 61, whereas the said bar may be I- or H-shaped. Thus, both carriages 5, 5' remain always applied on the guiding path G and keep the beam horizontal, said beam being fixed to the stems 43 of the actuators by pivot shafts 15, as indicated above.

The longitudinal displacement of the beam 1 between its two positions, respectively backward and forward, can be operated simply by an actuator 64 whose stem is linked, by an articulation, to one extremity of the beam 1, this actuator 64, which has been only been represented partially on FIG. 1, bears in the opposite direction on the foundation block.

As already stated, the device according to the invention advantageously exerts no horizontal reaction on the longitudinal displacement actuator 64 since the actuators 4, 4' impart perfectly vertical loads on the beam 1 that is guided directly with respect to the supporting carriages 5, 5'. Consequently, the longitudinal displacement of the beam 1 can be operated by a flexible link such a chain or a cable, in the way indicated diagrammatically on FIG. 9.

In such a case, indeed, both extremities of the beam 1 are fixed on two ends of a cable 7 driven, in one direction or in the other by a winch and running over an intermediate pulley 72 placed at the other extremity of the trench T. Such an arrangement would be cheaper since it does away with the use of large-sized longitudinal actuators.

Obviously, the invention is not limited to the details of the embodiment that has just been described, and also covers variations that could be conceived without departing from the protection framework defined by the claims.

For example, in another embodiment represented on FIGS. 7 and 8, the wheels 53, 53' of the carriage 5 are placed outside the caisson beam 1.

In such a case, each wing 13, 13' of the beam is fitted, for the passage of the pin 52 of each axle, with an oblong hole 16 of sufficient height to enable vertical displacements of the beam 1 and of width substantially equal, taking into account the necessary clearance, to the diameter of the axle 52, in order to ensure connection, in the longitudinal direction of the beam 1 with each carriage 5, 5'.

On the other hand, thanks to the very small height of the conveyor assembly, the conveyor need not be placed in a trench provided in the foundation block.

For example, in the case of the embodiment of FIGS. 7 and 8, the whole device can be placed above the floor level A, whereas the beam 1 is arranged between two longitudinal supports 8, 8' on which are mounted the pads 35, 35' composing the laying stations 3. As shown on FIG. 8, these longitudinal supports can be composed simply of I-shaped bars inside which the wheels 53, 53' of the carriage 5 engage, whereas each bar has two horizontal soles spaced by a height slightly greater than the diameter of the wheels, respectively a lower sole used as a guiding path and an upper sole fulfilling the anti-rise function of the carriage 5, in case when the beam may rock.

However, the supports 8, 8' could also be composed, simply of concrete walls placed on either side of the beam 1 and carrying the pads 35, 35'.

On the other hand, to increase the possibilities for storing reels between two successive installations, it is possible to use several conveyors of the type that has just been described.

In such a case, the beams 1, 1' of two successive conveyors are simply coupled by a linking rod 17 whose length is determined in order to maintain the spacing pitch (a) of the transversal planes P2, P'2 of the laying stations. An easy-to-design hydraulic system enables to operate, in a synchronous fashion, the actuators of all the conveyors in order to ensure stepwise displacement of the set of reels.

Besides, taking into account the load to be transported, it is particularly advantageous that the beam 1 be supported by synchronised hydraulic actuators, but mechanical screw-type actuators operated by a same cinematic chain could also be used.

The reference signs inserted after the technical features mentioned in the claims solely aim at facilitating the understanding of the said and do not limit their extent whatsoever.

What is claimed is:

1. A stepwise conveyor device for the transport of massive objects, comprising: a fixed series of laying stations distributed along a longitudinal displacement direction and centered on transversal planes spaced apart by a constant pitch and at least a mobile series of recovery stations spaced by the constant pitch and arranged on at least one longitudinal supporting beam vertically between a lowered position and a raised position for which the recovery stations are placed, respectively, below and above the laying stations, and longitudinally between a backward position and a forward position for which each recovery station is centered, alternately, on the transversal planes of two successive laying stations, the supporting beam resting on the floor on at least two vertically and horizontally sliding bearing members, of adjustable height extending vertically over at least one portion of the height of the beam, the sliding bearing members comprising, respectively, at least two actuators for level adjustment in a synchronous fashion and associated with at least two horizontally sliding guiding means of the supporting beam enabling longitudinal displacement of the said beam, respectively in a forward direction in raised position and in a backward direction in lowered position, whereas each actuator comprises two elements resting in opposed vertical directions, respectively on the beam and on the floor, for determining a rigorously vertical displacement of at least two bearing points of the beam.

2. A conveying device according to claim 1, characterised in that it comprises a means for controlling the alternating longitudinal displacement of the beam, composed of at least one hydraulic actuator with a first element bearing upon a section connected with the beam, in longitudinal displacement.

3. A conveying device according to claim 1, characterised in that the supporting beam comprises a horizontal sole with an upper face on which are mounted the laying stations and a lower face on which rest the adjustment actuators and at least one vertical stiffening girder, with sufficient height to ensure rigidity of the beam under the load of the objects transported, and in that the said adjustment actuators extend vertically on at least one section of the height of the girder in the lowered position of the beam.

4. A conveying device according to claim 3, characterised in that the supporting beam exhibits, as a transversal section, a reverted U-shaped bar comprising an upper substantially horizontal section, on which are provided the laying stations and two substantially vertical wings for stiffening the beam, between which are accommodated at least the level adjustment actuators.

5. A conveying device according to claim 4, in which the level adjustment actuators bear upon at least two supporting carriages resting, by means of running gears on a guiding path, characterised in that the assembly composed of each supporting carriage with its running gears and the adjustment actuator are not as wide as the space between both wings of the beam in order to rest at least partially in the said space in lowered position of the beam.

6. A conveying device according to claim 5, characterised in that the guiding path is not as wide as the space between both wings of the beam in order to penetrate at least partially into the said space, in lowered position of the beam.

7. A conveying device according to claim 4, in which the level adjustment actuators bear upon at least two supporting carriages characterised in that each supporting carriage comprises a chassis placed between both wings of the U-shaped beam and resting on both guiding rail by means of two running gears spaced longitudinally and each containing a pair of wheels placed outside the beam and mounted at two extremities of an axle running through a bore into the chassis and traversing both wings of the beam while running through oblong holes provided in the said wings and each of sufficient height to enable vertical displacements of the beam between the lowered position and the raised position.

8. A conveying device according to claim 7, characterised in that, on each side of the beam, the wheels of each supporting carriage are accommodated between two soles spaced vertically by a distance slightly greater, taking into account the necessary clearance, than the diameter of the wheels, whereas respectively a lower sole makes up a guiding path and an upper sole an anti-lift means.

9. A conveying device according to claim 7, characterised in that the width of each oblong hole for passing the extremity of an axle is substantially equal to the diameter of the said axle in order to provide a connection means, in the longitudinal direction, of the beam with the corresponding supporting carriage.

10. A conveying device according to claim 1, characterised in that the adjustment actuators bear upon at least two carriages resting, by means of running gears, on a guiding path provided on the floor, parallel to the longitudinal direction of displacement of the beam, whereas the said carriages compose sliding guiding means of the beam at a constant level determined by the adjustment actuators.

11. A conveying device according to claim 10, characterised in that each supporting carriage comprises a rigid chassis resting on the longitudinal guiding path by means of two running gears spaced longitudinally and on which is mounted at least one hydraulic actuator for level adjustment of the supporting beam.

12. A conveying device according to claim 11, characterised in that both running gears of the carriage are spaced longitudinally on either side of a central section of the chassis forming a bearing platform for at least one adjustment actuator having a first element bearing upon the chassis and a second element bearing upon the beam.

13. A conveying device according to claim 12, characterised in that each running gear of the carriage comprises a pair of wheels each running on a longitudinal rail and mounted on an axle passing through a bore with horizontal axis provided in the chassis of the carriage.

14. A conveying device according to claim 10, characterised in that the supporting carriages of the adjustment actuators are connected rigidly with the beam along the longitudinal direction in order to form a flat assembly behaving like a wagon running on the guiding path.

15. A conveying device according to claim 14, characterised in that the carriages supporting the adjustment actuators are connected by a linking bar of fixed length and in that the supporting beam is fitted with means for connection with the linking bar, in the longitudinal direction.

16. A conveying device according to claim 14, characterised in that each adjustment actuator comprises two elements connected rigidly, in vertical displacement, respectively one with the corresponding supporting carriage and the other with the beam and in that the said supporting carriages are held applied to the guiding path by an anti-rise means opposing the lifting motion of either of the supporting carriages with respect to the guiding path.

17. A conveying device according to claim 16, characterised in that the supporting carriages of the adjustment actuators are connected in the longitudinal direction by at least one linking bar composed of a structural bar having at least one sole passing below at least two anti-lift rollers spaced longitudinally.

18. A conveying device according to one of claims 1 to 16, characterised in that it comprises a means for alternating longitudinal displacement of the beam comprising a cable running over two intermediate means placed respectively at two extremities of the guiding path, and having two ends fixed respectively at both extremities of the supporting beam, whereas the said cable is driven into two opposite directions to control, respectively, the forward and the backward motion of the beam.

19. A conveying device according to one of claims 1 to 16, characterised in that the actuators of level adjustment of the beam are hydraulic actuators associated with a system for feeding the said actuators at a same constant flowrate to maintain the beam horizontal during its displacements, regardless of the distribution of the loads transported.

* * * * *